United States Patent
Sugden

[11] 3,783,461
[45] Jan. 8, 1974

[54] PLEASURE BOAT CONSTRUCTION

[76] Inventor: Dave Charles Sugden, 2935 W. 3590 South, Salt Lake City, Utah

[22] Filed: Oct. 2, 1972

[21] Appl. No.: 294,439

[52] U.S. Cl................................................ 9/1 R
[51] Int. Cl..................................................... B63c
[58] Field of Search..................... 9/2 R, 2 S, 2 F, 9/2 C, 1 T, 1 R, 6; 114/0.5 A, 56; D71/1 Q

[56] References Cited
UNITED STATES PATENTS
3,063,068 11/1962 Calkins........................................ 9/6

*Primary Examiner*—George E. A. Halvosa
*Assistant Examiner*—Sherman D. Basinger
*Attorney*—M. Ralph Shaffer

[57] ABSTRACT

An improved boat construction wherein the front and side windshield structure provides light for both a lower cabin area as well as for an upper viewing area. The upper horizontal portion of a molded dash, by way of example, constitutes a partition or roof of the so-defined cabin area. By the invention the cutting of apertures in the boat hull, deck or cabin for supplying light to the boat interior are avoided.

4 Claims, 3 Drawing Figures

PATENTED JAN 8 1974 3,783,461

PLEASURE BOAT CONSTRUCTION

The present invention relates to boat constructions, and more particularly, to a new and improved boat construction, and improvements therein, wherein the front and side windshields supply light and visibility not only for standing and seated occupants in the primary area of the occupant-seating-well, but also for a lower, enclosed or partially enclosed cabin area. The lower cabin area is delineated relative to the upper area by a dash construction having a horizontal portion defining the roof of the lower cabin.

In the past, considerable difficulty has been encountered as to construction for providing light to boats containing lower cabin areas. Frequently, the hull, deck or cabin is provided with cut-outs suitable for receiving appropriate transparent panes, such as conventional glass panes, for permitting light transmissivity. This approach materially increases the cost of construction as well as provides opportunity for leakage.

In the present invention, the windshield structure, both front and side, are enlarged as to vertical dimension and include horizontal intermediate crossrails or rail structure accommodating attachment thereto of the upper and enlarged horizontal portion of a molded dash. This horizontal portion constitutes effectively the roof and ceiling of the cabin area, making it possible for the same windshield to provide light not only for the upper occupant area of the boat but also for the lower cabin portion thereof. Metal screws, rivets or other attachment means may be used for securing the dash to the crossbar extrusions of the front and side window structures. Other types of attachment may likewise be used.

Accordingly, a principal object of the present invention is to provide a new and improved boat construction.

A further object is to provide for improvements in boat constructions such that light and visibility can be readily enjoyed both at a lower cabin area and also at an upper occupant area by means of the provision of a single or composite windshield structure, and this without providing cutouts for windows in the hull, deck or cabin area of the boat proper.

A further object of the invention is to provide in a boat construction a configured dash having a horizontal portion constituting the ceiling and roof of a lower cabin area in a boat.

A further object is to provide a pleasure boat a windshield construction having crossbar-type constructions with window means above and below the same, such that the crossbar constructions may serve as mounting means for the accommodating attachment thereto of the upper essentially horizontal portion of a molded dash.

The features of the present invention may best be understood by reference to the following description taken in connection with the accompanying drawings in which.

Figure 1:
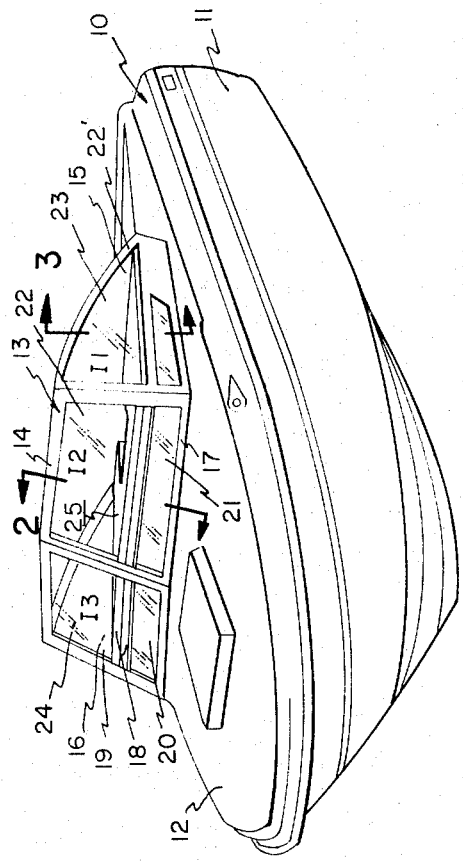
FIG. 1 is a perspective view of a boat incorporating the structural features of the present invention.

In FIG. 1 the boat 10 is shown to include the usual hull 11 and deck 12. Other features such as the guard rail, steering and motor structure, and so forth are conventional and not shown, for convenience of illustration. What is important is the provision of a composite window framework 13 comprising front window structure 14 and side window structures 15 and 16. Window structure 14 comprises a frame 17 made of a series of extruded aluminum sections 18, by way of example, to form the complete framework. Glass or transparent plastic panels or panes 19, 20, 21 and 22 are as shown in the drawings, coplanarly installed in the framework in the customary manner as by rubber sealing bead extrusions, and so forth. Side window frameworks 15 and 16 correspondingly include frames 22′, likewise made of extrusion material by way of example, and have side windows or panes 23 and 24.

Figure 3:
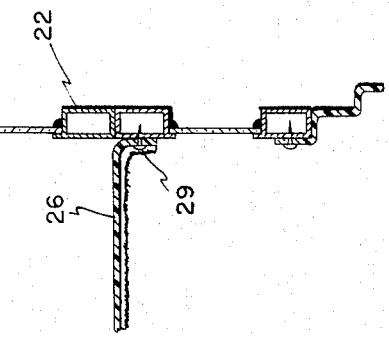
FIG. 3 is an enlarged vertical section taken along the line 3—3 in FIG. 1.
Figure 2:
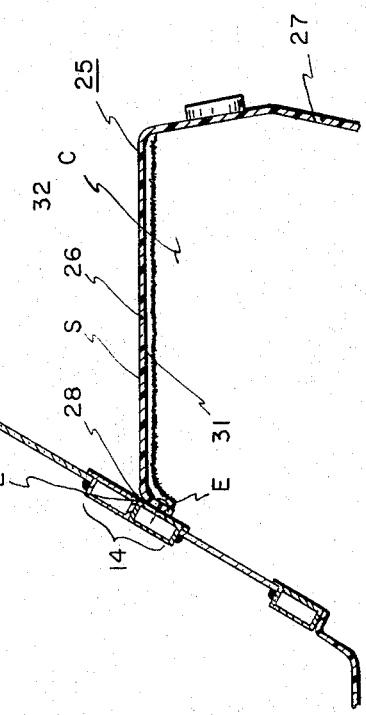
FIG. 2 is an enlarged, fragmentary, vertical section taken along the line 2—2 in FIG. 1.

Of importance in the invention is that the molded dash 25, see FIG. 2, and comprising upper portion 26 and lower portion 27, is screwed, riveted or otherwise secured as at 28 to the framework structure 14, by way of example, of the front window area. Correspondingly, FIG. 3 illustrates that the upper portion 26 of the molded dash is secured by screws or other suitable means as at 29 to the side frame structure as at 22. Top portion 26 of the dash, in effect, forms the ceiling and roof of the cabin area at C. Accordingly, such cabin area, see also FIG. 1, is lighted by virtue of the lower panes and the front and side window structures.

If desired, the upper surface S of upper portion 26 of the dash may be laminated or provided with suitable sheeting, fabric or other material. The bottom portion, for decorative as well as other purposes, may be provided with a decorative pile-type carpeting material as at 31 that is glued at 32 to the bottom surface of the upper portion of the dash. Marginal edges E may overlap and be glued to the screwed portions of the dash.

It will be understood that attachments or attachment means will be provided the lip L of the dash completely about the window structure proximate the intermediate extruded, crossbar or crossrail portions I1, I2 and I3 of the window structure.

It is thus seen that the present invention supplies a great need in the boat industry wherein holes need not be cut in the hull or deck to provide window area relative to the closed cabin. Rather, the windshield structure at front and sides is itself provided with structural means separating not only the upper and lower panes but also providing a ceiling and roof for the lower cabin area.

While particular embodiments of the invention has been shown and described, it will be obvious to those skilled in the art the various changes and modifications which may be made without departing from the essential features of the present invention and, therefore, the aim in the appended claims is to cover all such changes and modifications as fall whthin the true spirit and scope of the invention.

I claim:

1. In a boat construction having a hull, a deck disposed above said hull, and structure defining a primary occupant area contiguous with said deck and a lower cabin contiguous with and disposed forwardly of said primary occupant area: windshield structure upstanding from said deck and disposed forwardly of said primary occupant area, said windshield structure including coplanar, upper and lower light transmitting portions at front and opposite sides thereof and framework means mounting said portions and including essentially horizontal, U-shaped crossrail means disposed between said portions, and a dash including an essentially horizontal portion secured to said crossrail means to form the roof of said lower cabin.

2. The construction of claim 1 wherein said windshield structure comprises front and opposite-side window structures, said crossrail means extending in an essentially medial, horizontal, U-configurement, said horizontal portion of said dash including an attachment flange, and means for securing said flange to said crossrail means.

3. Structure according to claim 1 wherein said lower portion is disposed at a level beneath said horizontal portion of said dash, whereby to provide light and visibility to said lower cabin area.

4. In the boat construction of claim 1, carpeting inverted relative to its normal upstanding disposition and secured underneath and to said horizontal portion of said dash and extending overjunctures of said horizontal portion of said dash with said crossrail means, said horizontal portion of said dash including a depending flange means cooperatively forming said junctures.

* * * * *